Oct. 17, 1967   H. R. LINDSTROM ET AL   3,347,350
COMBINATION CONVEYOR SUPPORT AND DRIVE
Filed June 23, 1966                           2 Sheets-Sheet 1

INVENTORS
H. R. LINDSTROM &
R. L. BELDIN
BY William A. Murray
ATTORNEY

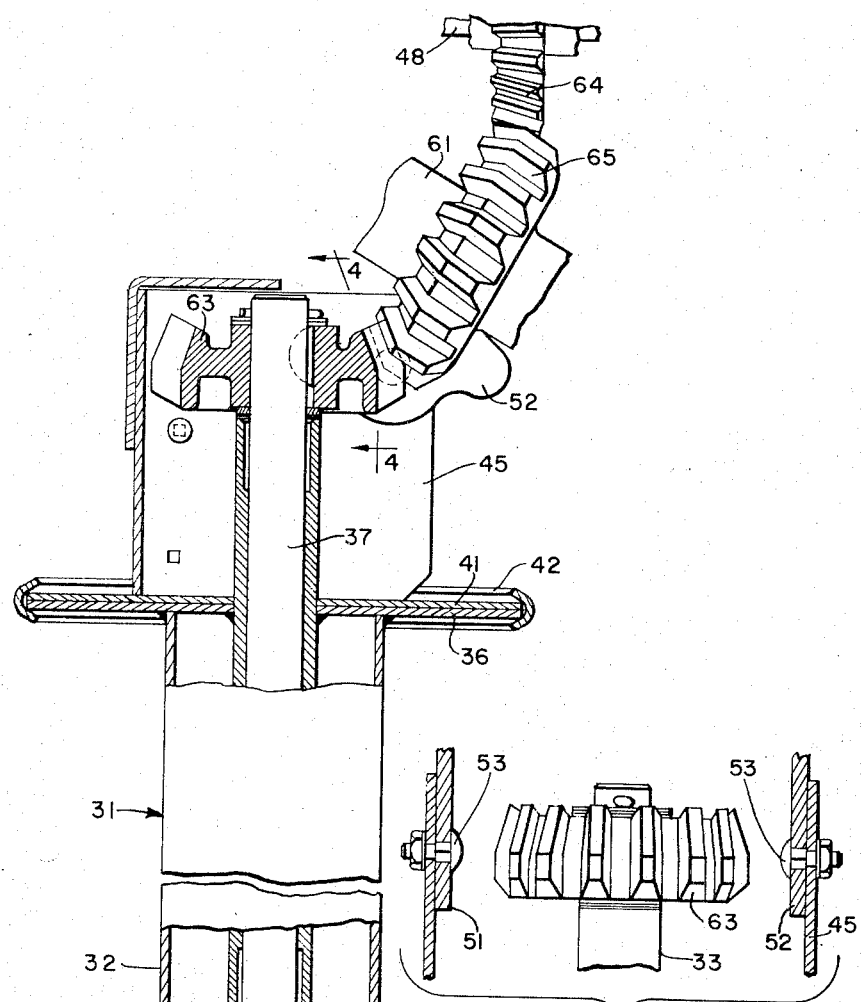
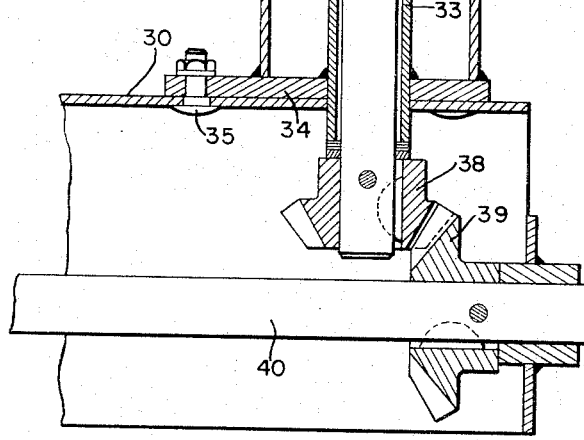
FIG. 4
FIG. 3
INVENTORS
H.R. LINDSTROM &
R.L. BELDIN
BY William A. Murray
ATTORNEY

United States Patent Office 3,347,350
Patented Oct. 17, 1967

3,347,350
COMBINATION CONVEYOR SUPPORT AND DRIVE
Harold Richard Lindstrom, Rock Island, and Royal Lowell Beldin, East Moline, Ill., assignors to Deere & Company, Moline, Ill., a corporation of Delaware
Filed June 23, 1966, Ser. No. 559,759
8 Claims. (Cl. 198—119)

ABSTRACT OF THE DISCLOSURE

A supporting structure for an elongated conveyor housing having therein a conveyance device that includes a base, an upright column on the base, a rounded radial plate fixed to the top of the column; a structure connected to the conveyor housing having a downwardly facing plate on the upper surface of the other plate; an adjustable collar around the edges of the plates for retaining the plates together and for permitting the structure to swivel relative to the column; and a drive shaft extending axially through the column and having bevel gear means at its upper end for driving the conveyance device.

---

This invention relates to a material conveyor and more particularly to the conveyor support and drive.

In unloading grain from grain bins it is often necessary to utilize an elongated conveyor that includes a housing and a conveyance mechanism within the housing that moves material from an intake end of the housing to its discharge end. Often such conveyors are utilized to load a trailer or wagon and consequently it is necessary to provide some type of articulation of the housing support so that the conveyor may be raised and lowered as well as moved laterally about an area adjacent the intake end.

With the above in mind, it is the main object of the present invention to provide a support and drive for the lower intake end of a discharge conveyor that permits the necessary articulation of the conveyor housing so that the conveyor may move laterally and vertically without interrupting or requiring further adjustment of the drive mechanism.

Specifically it is an object of the invention to provide a support for the conveyor that includes a base member supported on a basic frame and an upright tubular column fixed at its lower end to the base member. A radial plate is fixed to the column and supports a second or upper radial plate. The upper plate carries a pivotal support that connects to the lower or intake end of the conveyor housing so as to permit the housing to be adjusted vertically. An adjustable collar circumscribes the outer edges of the upper and lower plates and may be tightened so as to frictionally hold the upper plate and the conveyor against angular movement about a vertical axis. The two plates are consequently frictionally held not necessarily to frictionally lock the conveyor against movement, but to prevent accidental swinging or movement of the conveyor.

An upright drive shaft extends through the column and has its lower end connected to a drive and its upper end connected to a drive that is connected in turn to the conveyance device in the conveyor. The upper drive is composed of a bevel gear fixed on the shaft and a second bevel gear arrangement that is connected to the conveyance device. There are multiple bevels in the teeth of each of the gears so that as the conveyor is adjusted vertically, the teeth will remain in engagement and drive the conveyance mechanism irrespective of the location of the conveyor housing.

Other objects and advantages of the invention will become apparent to those skilled in the art as the nature of the invention is better understood from the following description and as shown in the accompanying drawings.

FIG. 3 is an enlarged vertical sectional view through the center of the support and drive mechanism.

FIG. 4 is a sectional view taken substantially along the line 4—4 of FIG. 3.

Figure 1:
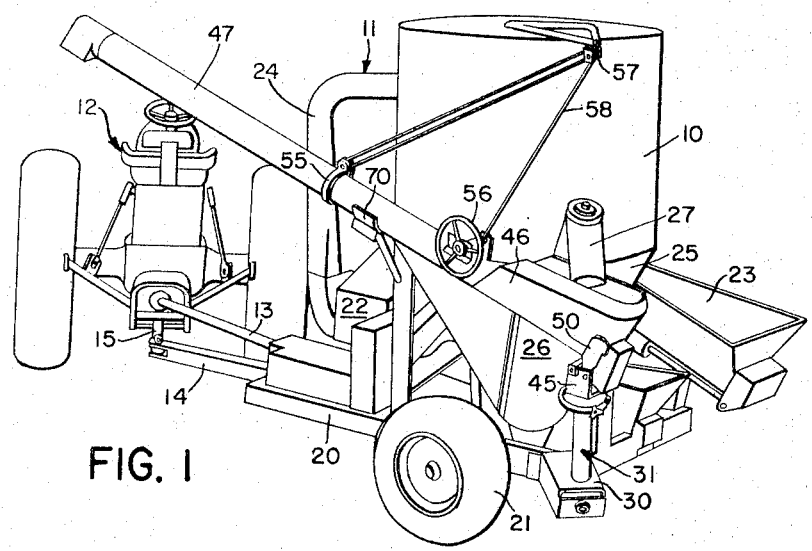
FIG. 1 is a rear and side perspective view of a tractor and implement utilizing the conveyor and supporting mechanism of the present invention.
Figure 2:
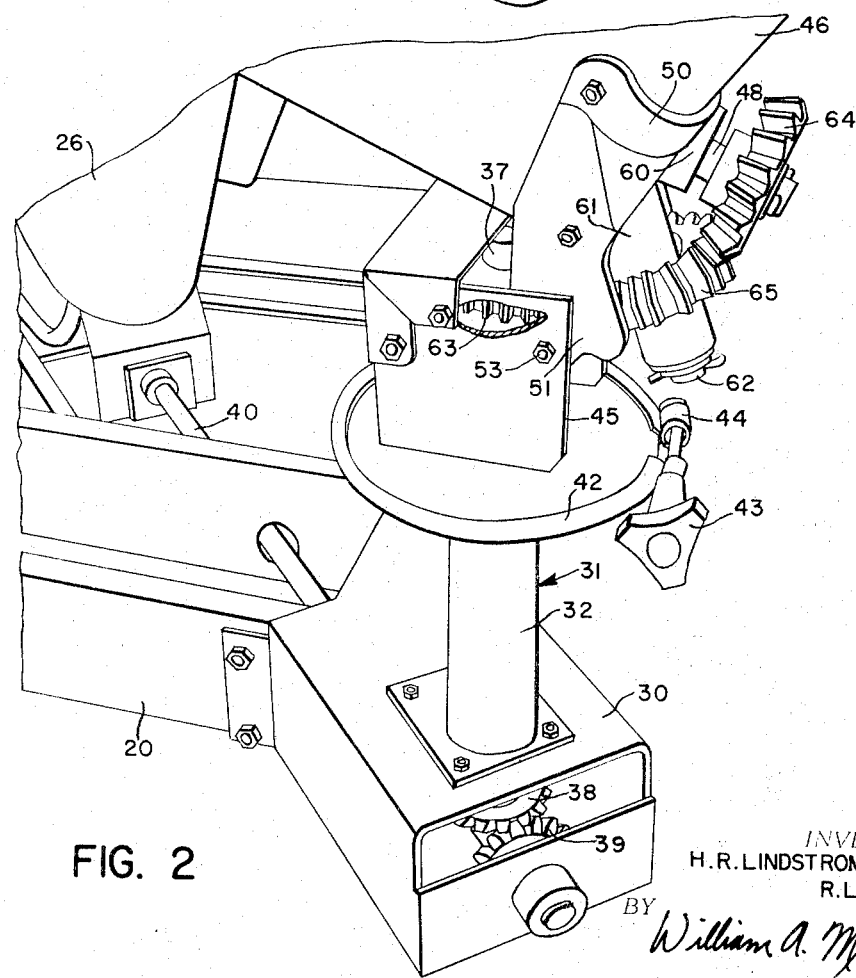
FIG. 2 is a rear and side perspective view of the support and drive mechanism for the conveyor, with portions thereof broken away to show internal mechanism.

The conveyor presently to be described is one that may be best utilized in combination with and for discharging grain from a grain bin that is part of a mixer-mill implement, indicated in its entirety by the reference numeral 11. The implement is drawn by a tractor 12 and has a forward main drive shaft 13 connected to the tractor power take-off shaft and a forward tongue 14 that is connected to a conventional type drawbar 15 on the tractor.

The mixer-mill implement 11 includes a main frame 20 supported on a pair of transport wheels, one of which is shown at 21. The frame supports a material reducing mill 22 and a material feeder conveyor 23 that feeds the material into the mill 22. A blower type conveyor 24 moves the material from the mill 22 into the grain bin 10. The lower end 25 of the bin 10 is conical-shaped. Supported on the outer side of the conical portion 25 is an inclined auger structure, indicated in its entirety by its housing 26, that moves the treated grain upwardly and outwardly to a discharge spout 27.

Provided and rigidly fixed to the rear left corner of the main frame 20 is a frame extension 30 that operates as the base for an upright column 31. The column 31 is composed of an outer cylinder or tube 32 and an inner cylinder or tube 33, both of which project through a suitable opening in the base 30. The outer cylinder 32 is welded to the upper surface of a supporting plate 34 that may be bolted at 55 to the base 30. The upper edge of the cylinder 32 is welded to the underside of a circular horizontally disposed plate 36. The inner cylinder 33 extends upwardly through the plate 36 and downwardly below the plate 34 and is suitably fixed by welding to those plates.

The internal cylinder 33 has internal journal means that supports an upright drive shaft 37. A bevel gear 38 is keyed to the lower end of the shaft 37 and is driven by a bevel pinion 39 pinned to a horizontal shaft 40. The shaft 40 is driven by suitable means, not shown, that receives its basic power from the main drive shaft 13. Overlying the plate 36 is an upper horizontal plate 41. The plate 41 has a central opening through which the inner cylinder 33 may pass. The plates 36, 41 have outer annular edges on which is mounted a U-shaped collar 42 that circumscribes the edges except for a small gap between opposite ends of the collar 42. A nut 44 is fixed to one end of the collar 42 and a bolt 43 is fixed for rotation on the opposite end of the collar 42. By adjustment of the bolt 43, the collar may be tightened or loosened against the edges of the plates 36, 41. When tightened, the upper plate 41 is frictionally held against rotation.

Projecting upwardly from the upper surface of the upper plate 41 is a U-shaped bracket structure 45 that surrounds or embraces the upper ends of the shaft 37 and inner cylinder 33. Positioned above the bracket 45 is the hopper 46 of an elongated conveyor or auger housing 47 that has suitable material conveying means or an auger therein, such being shown only by the terminal or lower end of the auger shaft 48 that extends outwardly and downwardly from the hopper 46. Bolted to the heel or lower rear end of the hopper 46 is a casting bracket structure 50 that has a pair of depending arms 51, 52 that fits inside of and alongside the upright walls of the U-shaped bracket structure 45. The arms 51, 52 are connected to the respective walls of the bracket structure 45 by suitable pins 53 so as to permit the entire conveyor housing 47 to swing vertically about the pins 53.

A collar 55 is provided externally of the auger housing 47 and a crank and winch 56 is provided on the lower end of the housing 47. A pulley 57 is fixed to the upper end of the tank 10 and a cable 58 extends between the collar 55, the pulley 57, and the winch 56. By suitable turning and locking of the winch and crank 56, the entire conveyor housing 47 may be adjusted vertically about the pins 53.

The casting 50 has a pair of bosses 60, 61. The upper boss 60 journals the conveying mechanism drive shaft 48, and the lower boss 61 supports an idler shaft 62. A drive connection extends between the upper end of the vertical shaft 37 and the conveyor mechanism shaft 48 and includes a bevel gear 63 on the shaft 37, a bevel gear 64 on the shaft 48, and an idler gear 65 on the shaft 62. Each of the gears 63, 65 has two bevels therein which permit the two gears to rock relative to one another so as to accommodate vertical movement of the auger housing 47. Viewing FIG. 3, it should be noted that the transverse horizontal axis of the pins 53 is substantially on the tangent to the pitch circles of the respective bevel gears 63, 65. Therefore, substantially at the point of pivot between the auger housing 47 and the bracket structure 45 is the power transmitting location between the two sprockets 63, 65. The axis of the pins 53 is substantially aligned with the tangent to the pitch circles of both the bevel gears 63, 65.

In operation, the entire conveyor is supported to swing laterally on the plate 36. It is also supported to swing vertically on the pins 53. It should be noted that in the lateral movement, it is generally desired not to completely lock the auger against movement but only to frictionally resist movement of the auger conveyor 47 so that once placed the conveyor will be held in that position until sufficient external force is created to move it. The bolt 43 may of course be tightened sufficiently to almost completely prevent swinging of the conveyor, such occurring when it is desired to transport the unit along the highway. In the latter position, the auger housing 47 will normally be carried on a rest or support 70.

While only one form of the invention has been shown, it should be recognized that other forms and variations will occur to those skilled in the art. Therefore, while the preferred form was shown and described in concised and detailed manner for the purpose of clearly and concisely illustrating the principles of the invention, it should be understood there is no intention to limit or narrow the invention beyond the broad concepts set forth in the appended claims.

What is claimed is:

1. For use with a conveyor for moving material including an elongated housing having a material intake end, a conveyance device therein for moving material from the intake end, the improvement residing in a combination drive and support therefor comprising: a base; an upright tubular column fixed at its lower end to the base; a first radial plate fixed to the upper end of the column and having an outer annular edge outward of the column; a second radial plate complementary to and disposed on the upper surface of the first plate with an outer edge substantially aligned with the aforesaid annular edge; an adjustable collar circumscribing the aforesaid edges for retaining the plates together and adapted to engage the plates for resisting swiveling of the second plate relative to the first plate; a vertical drive shaft journaled within the column and having an upper end above the second plate; a drive connection on the lower end of the shaft; means supporting the conveyor on the second plate; and a drive connection between the upper end of the shaft and the conveyance device for operating the latter.

2. The structure as set forth in claim 1 in which the means supporting the conveyor housing on the upper plate is an upwardly projecting bracket structure rigid with the upper plate and embracing the upper end of the shaft and having a horizontal pivot offset to a side of the shaft, and a depending portion rigid with the housing adapted to be carried on the pivot.

3. The structure as set forth in claim 2 in which the drive connection between the upper end of the shaft and the conveyance device includes intermeshing bevel gears on the shaft and device respectively with the teeth of the gears having a multiple bevel in relation to their respective shafts to accommodate angular adjustment of the housing about the horizontal pivot.

4. The structure as set forth in claim 3 in which the horizontal pivot is on an axis substantially aligned with a tangent to the pitch circles of both bevel gears.

5. The structure as set forth in claim 1 in which the column is composed of inner and outer concentric tubes with the inner tube having journals at its upper and lower ends supporting the shaft.

6. For use with a conveyor for moving material including an elongated housing having a material intake end, a conveyance device therein for moving material from the intake end, the improvement residing in a combination drive and support therefor comprising: a base; an upright tubular column fixed at its lower end to the base; a first radial plate fixed to the column and having an outer annular edge; a second radial plate complementary to and disposed on the upper surface of the first plate with an outer edge substantially aligned with the aforesaid annular edge; an adjustable collar circumscribing the aforesaid edges for retaining the plates together and adapted to engage the plates for resisting swiveling of the second plate relative to the first plate; a vertical drive shaft within the column having an upper end above the second plate; a drive connection on the lower end of the shaft; upright structure projecting upwardly from the second plate pivotally supporting the conveyor on the second plate for vertical adjustment; and a drive connection between the upper end of the shaft and the conveyance device for operating the latter.

7. The structure as set forth in claim 6 in which the drive between the upper end of the shaft and the conveyance device is articulately interjoined to accommodate vertical movement of the conveyor about its pivotal support.

8. The structure as set forth in claim 6 in which the collar is U-shaped in cross section and opens inwardly above and below the plates.

References Cited

UNITED STATES PATENTS

| 275,861   | 4/1883 | Ross       | 74—385    |
| 311,317   | 1/1885 | Hasselman  | 198—119 X |
| 1,381,328 | 6/1921 | Morrissey  | 198—119   |
| 2,078,863 | 4/1937 | Lundbye    | 198—119   |

FOREIGN PATENTS 885,996 1/1962 Great Britain.

EDWARD A. SROKA, *Primary Examiner.*